(12) United States Patent
Phua et al.

(10) Patent No.: US 7,058,102 B2
(45) Date of Patent: Jun. 6, 2006

(54) HIGH-POWER SOLID-STATE LASER

(75) Inventors: Poh Boon Phua, Cambridge, MA (US); Kin Seng Lai, Singapore (SG); Rui Fen Wu, Singapore (SG); Yuan Liang Lim, Singapore (SG); Wei Pin Ernest Lau, Singapore (SG)

(73) Assignee: DSO National Laboratories, Singapore (SG)

( * ) Notice: Subject to any disclaimer, the term of this patent is extended or adjusted under 35 U.S.C. 154(b) by 524 days.

(21) Appl. No.: 09/956,493

(22) Filed: Sep. 18, 2001

(65) Prior Publication Data

US 2003/0053500 A1    Mar. 20, 2003

(51) Int. Cl.
H01S 3/14    (2006.01)
H01S 3/91    (2006.01)
H01S 3/92    (2006.01)
H01S 3/08    (2006.01)

(52) U.S. Cl. .............................. 372/39; 372/70; 372/98
(58) Field of Classification Search ................. 372/69, 372/70, 72, 35, 39
See application file for complete search history.

(56) References Cited

U.S. PATENT DOCUMENTS 3,487,330 A * 12/1969 Gudmundsen ................ 372/35
5,636,239 A *  6/1997 Bruesselbach et al. ........ 372/70
5,936,984 A *  8/1999 Meissner et al. .............. 372/34
5,978,407 A * 11/1999 Chang et al. .................. 372/72
6,090,102 A *  7/2000 Telfair et al. .................. 606/10
6,704,341 B1 *  3/2004 Chang .......................... 372/70

OTHER PUBLICATIONS

Honea et al; 115-W Tm:YAG Diode-Pumped Solid-State Laser; IEEE Jnl of Quantum Electronics Sep. 1997; 9 pp.
Bowman et al; High Power diode pumped two micron lasers; 156/SPIE Jan. 1993; 8 pp.
Rustad et al; Low Threshold Laser-Diode Side-Pumped TM:YAG and TM:Ho:YAG Lasers; IEEE Jnl of Selected Topics in Quantum Electronics Feb. 1997 8 pp.
Phua Room-Temperature Operation of a Multiwatt Tm:YAG laser pumped by a 1um Nd:YAG Laser; Optics Letters; May 2000 3 pp.
Rustad et al; Modeling of Laser-Pumped Tm and Ho Lasers Accounting for Upconversion and Ground-State Depletion; IEEE Jnl of Quant Electronics Sep. 1996 12 pp.
Chang; An Efficient Diode-Pumped Nd:YAG Laser w/ 451 of CW IR and 182 W of Pulsed Green Output; Opt Soc of America TOPS Jan. 1998; 5 pp.
Stine et al; Solar Energy Fundamentals and Design; Wiley & Sons Feb. 1988; pp. 257-262.

* cited by examiner

Primary Examiner—Armando Rodriguez
(74) Attorney, Agent, or Firm—IPSOLON LLP

(57) ABSTRACT

A device for producing laser radiation, the device comprising: an elongate sample of a quasi-three-level laser material; a source of pumping radiation; and a concentrator configured such that at least some of the pumping radiation emitted by the source of pumping radiation is concentrated by the concentrator and subsequently enters the sample through a side surface thereof.

16 Claims, 2 Drawing Sheets

HIGH-POWER SOLID-STATE LASER

THIS INVENTION relates to a laser, and in particular to a method and apparatus for efficiently producing laser radiation from quasi-three-level laser materials.

High-powered lasers having wavelengths in the region of 2 µm find application in several important medical and remote-sensing applications. However, it has proved technically difficult and expensive to produce such high-powered lasers.

Most attempts to produce a high-powered laser in the 2 µm wavelength region employ a sample of Tm:YAG (thulium-doped yttrium-aluminium-garnet). Because of the small stimulated-emission cross section of $Tm^{3+}$ ions and their quasi-three-level nature at room temperature, efficient pumping of a sample of Tm:YAG often requires the use of intense pumping power to overcome the high lasing threshold. However, this approach can lead to the drawbacks of ground-state depletion and reduced absorption of the pumping radiation.

In addition, when an excessively high intensity of pumping radiation is used, the efficiency of the laser is likely to suffer as a result of up conversion processes in excited $Tm^{3+}$ ions (for instance, from the $^3F_4$ level to higher energy levels such as $^3H_4$ and $^3H_5$). These up conversion processes deplete the population inversion, and generate unhelpful thermal energy.

The doping concentration (i.e. the concentration of $Tm^{3+}$ ions in the Tm:YAG sample) must be carefully selected, as a large doping concentration is required if one wishes to achieve high quantum efficiency as a result of a cross-relaxation process, which converts one $^3H_4$ excited state into two $^3F_4$ upper laser states. However, if the doping concentration of the Tm:YAG sample is too high, there will be an increase in the laser oscillation threshold because of the quasi-three-level nature of $Tm^{3+}$. These constraints must be balanced against one another to arrive at an appropriate doping concentration for a Tm:YAG sample that is to be used to generate a laser output.

It is an object of the present invention to provide a device for producing laser radiation from quasi-three-level laser materials such as Tm:YAG that alleviates some of the above difficulties.

Accordingly one aspect of the present invention provides a device for producing laser radiation, the device comprising: an elongate sample of a quasi-three-level laser material; a source of pumping radiation; and a concentrator configured such that at least some of the pumping radiation emitted by the source of pumping radiation is concentrated by the concentrator and subsequently enters the sample through a side surface thereof.

Advantageously, the sample is a sample of Tm:YAG, Yb:YAG, Tm:YLF or Tm:YALO.

Preferably, the concentrator comprises a pair of substantially parabolic mirrors.

Conveniently, the device comprises a plurality of sources of pumping radiation, each of the sources of pumping radiation being associated with a respective concentrator.

Advantageously, a pair of endcaps are provided at respective ends of the sample.

Preferably, the endcaps comprise substantially undoped laser material.

Conveniently, the endcaps comprise substantially undoped YAG, YLF or YALO.

Advantageously, the sample has an atomic doping concentration of around 3%.

Preferably, the sample is cooled by the flow of a liquid therepast.

Conveniently, the liquid is water or a mixture of water and glycerol.

Advantageously, the size of a space through which the liquid flows to cool the sample is chosen to be as small as possible while cooling the sample effectively.

Preferably, the device comprises a pair of mirrors positioned opposite opposing ends of the sample.

Conveniently, the sample is housed in a pump chamber, the ratio of the cross-sectional width of the sample and the cross-sectional width of the chamber being at least 3/5.

Another aspect of the present invention provides a method of producing laser radiation, the method comprising the steps of: providing an elongate sample of a quasi-three-level laser material; providing a source of pumping radiation; providing a concentrator; and configuring the concentrator such that at least some of the pumping radiation emitted by the source of pumping radiation is concentrated by the concentrator and subsequently enters the sample through a side surface thereof.

Advantageously, the step of providing a sample comprises the step of providing a sample of Tm:YAG, Yb:YAG, Tm:YLF or Tm:YALO.

Preferably, the step of providing a concentrator comprises the step of providing a pair of substantially parabolic mirrors.

Conveniently, the step of providing a plurality of sources of pumping radiation, each of the sources of pumping radiation being associated with a respective concentrator.

Advantageously, the method further comprises the step of providing a pair of endcaps at respective ends of the sample.

Preferably, the step of providing endcaps comprises the step of providing endcaps comprising substantially undoped laser material.

Conveniently, the endcaps comprise substantially undoped YAG, YLF or YALO.

Advantageously, the step of providing a sample comprises the step of providing a sample having an atomic doping concentration of around 3%.

Preferably, the method further comprises the step of cooling the sample by the flow of a liquid therepast.

Conveniently, the liquid is water or a mixture of water and glycerol.

Advantageously, the method further comprising the step of providing a space through which the liquid flows to cool the sample, the space being as small as possible while cooling the sample effectively.

Preferably, the method further comprises the step of providing a pair of mirrors positioned opposite opposing ends of the sample.

Conveniently, the method further comprises the step of housing the elongate sample in a pump chamber, the ratio of the cross-sectional width of the sample and the cross-sectional width of the chamber being at least 3/5.

In order that the present invention may be more readily understood, the embodiments thereof will now be described, by way of example, with reference to the accompanying drawings, in which.

Figure 1:
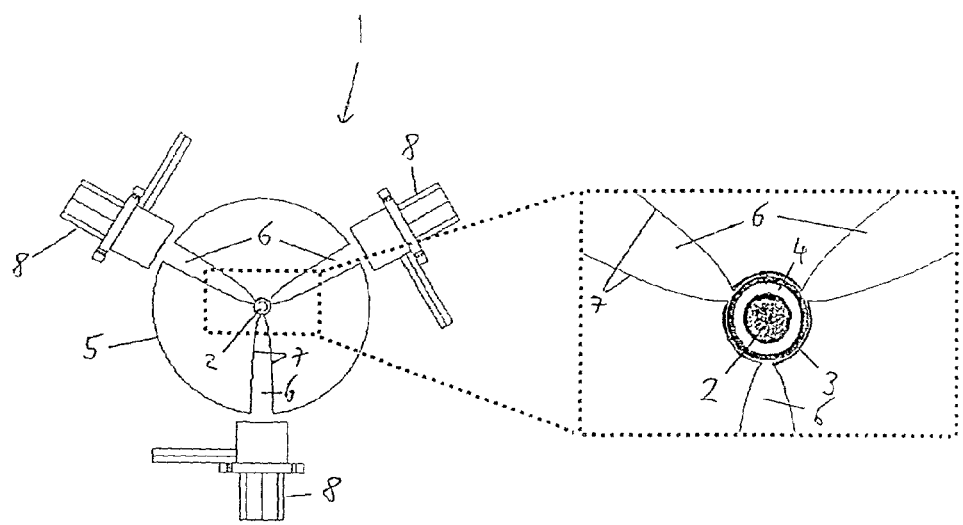
FIG. 1 is a schematic representation of a device embodying the present invention.

Turning firstly to FIG. 1, a device 1 embodying the present invention comprises a rod 2 of Tm:YAG. In a preferred embodiment of the present invention, the rod has a length of approximately 105 mm, and a diameter of approximately 3 mm.

The rod 2 is substantially surrounded by a flow tube 3, and a pumping system (not shown in FIG. 1) is operable to pump a liquid coolant, such as water or a mixture or water and glycerol) through a space 4 between the rod 2 and the flow tube 3, thereby allowing a degree of control over the temperature of the rod 2.

The rod 2 and flow tube 3 are positioned on or near the longitudinal axis of a substantially cylindrical concentrator block 5, in a central chamber of the concentrator block 5, which central chamber acts as a pump chamber. Preferably the diameter of the central chamber of the concentrator block 5 is in the region of 5 mm. The large ratio (preferably in the region of 3/5 or greater) of the diameter of the rod 2 and the central chamber of the concentrator block 5 confers advantages with regard to the efficient pumping of the device 1. The width of the flow tube 3, which is also located inside the central chamber of the concentrator block 5, is chosen to be as small as possible while effectively cooling the rod 2.

The concentrator block 5 comprises three elongate passages 6 which extend between the rod 2 and the exterior surface of the concentrator block 5, and are substantially uniform in cross-section along the length of the concentrator block 5. The passages 6 are evenly spaced around the concentrator block 5 such that, if the concentrator block 5 is viewed end-on, there is approximately 120° between adjacent passages.

Each of the internal walls 7 of the passages 6 is parabolic, the two walls 7 of each passage 6 being tilted with respect to one another. The focal point of each parabolic wall 7 of a passage 6 lies on the surface of the other parabolic wall 7 of the passage 6.

As will be understood by a person skilled in the art, such an arrangement of parabolic walls 7 behaves as a compound parabolic concentrator (CPC). CPC's are used to collect and concentrate light, for instance solar power, and a useful feature of CPC's lies in their ability to compress broad light beams through a narrow slit. In a preferred embodiment of the present invention, the input aperture of each of the CPC's formed by the passages 6 has a width of approximately 9.5 mm, and the output aperture has a width in the region of 0.75 mm.

Opposite the external end of each of the three passages 6 is provided a diode laser array 8. Each of the three diode laser arrays 8 is positioned so that radiation emitted thereby is directed into the respective passage 6.

Figure 2:
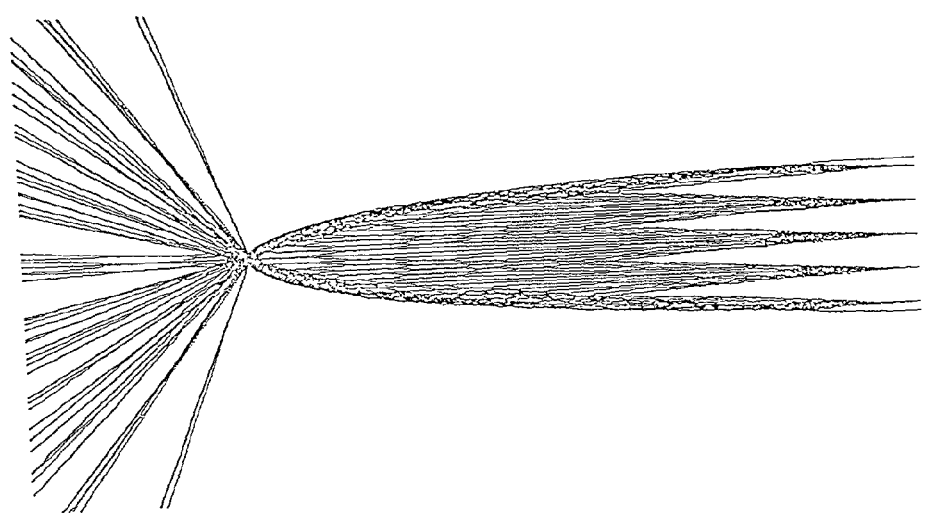
FIG. 2 is a schematic representation showing ray tracing of light through a concentrator suitable for use in the device of FIG. 1.

Turning to FIG. 2, a schematic ray-tracing diagram of the passage of light from an array of diodes through a CPC is shown (the light travels from right to left in FIG. 3), and it will be appreciated that the concentration of the light (in terms of photons per unit cross sectional area) at the exit of the CPC is substantially higher than that at the entrance thereof.

Returning to FIG. 1, it will be understood that the light produced by the three laser diode arrays 8 is concentrated by the CPC's formed by the reflective walls 7 of the passages 6, and that the exit apertures of the CPC's formed by the passages 6 are positioned adjacent the rod 2 at the centre of the concentrator block 5.

In operation of the device 1, power is provided to the three diode laser arrays 8, causing the diode laser arrays 8 to emit radiation towards the concentrator block 5. As described above, the radiation passes through the passages 6 provided between the diode laser arrays 8 and the rod 2, and is concentrated by the CPC's formed by the passages 6 before being delivered to the rod 2.

The internal surface of the central chamber of the concentrator block 5 is substantially reflective to the radiation produced by the diode laser arrays 8. Hence, although the absorption cross section of the $Tm^{3+}$ ions in the rod 2 of Tm:YAG to the radiation produced by the diode laser arrays 8 is relatively low, the radiation is likely to be internally reflected within the central chamber of the concentrator block 5 several times if it is not immediately absorbed by the rod 2, and it will be understood that the provision of such a reflective inner surface substantially increases the amount of radiation that will be absorbed by the rod 2.

Figure 3:
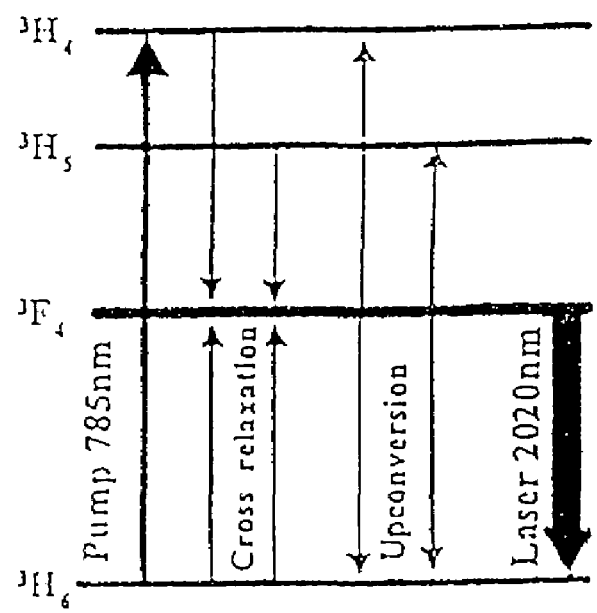
FIG. 3 is a schematic representation of some of the energy levels in a $Tm^{3+}$ ion.

Turning to FIG. 3, a schematic representation of some of the energy levels in a $Tm^{3+}$ ion is shown. It will be seen from FIG. 3 that the transition of an electron from the $^3F_4$ energy level to the $^3H_6$ level produces a photon having a wavelength of 2.02 μm, which is a desirable wavelength for the laser produced by the device 1.

Ideally, in use of the device 1, a photon of the radiation produced by the diode laser arrays 8 (the pumping radiation) is absorbed by a $Tm^{3+}$ ion, causing reflectivity of the second mirror 10 to radiation having a wavelength in the region of 2 μm is between 70% and 75%.

It will be understood that the absorption of the pumping radiation by the rod 2 of Tm:YAG will cause the emission of many photons having wavelengths of 2.02 μm, and that standing waves of these photons between the first and second mirrors 9, 10 will be produced. Due to the relatively low reflectivity of the second mirror 10 to radiation having a wavelength in the region of 2 μm, a portion of the radiation constituting the standing wave will escape through the second mirror 10, and this portion of escaping radiation constitutes the laser beam produced by the device 1.

In an advantageous embodiment of the present invention, the rod 2 consists of a central doped section, having a 3% $Tm^{3+}$ atomic doping concentration as discussed above. In addition, the rod 2 comprises two undoped YAG endcaps 11, respectively constituting opposite ends of the rod 2. The provision of undoped YAG endcaps 11 has the effect of reducing reabsorption losses in the unpumped region of the rod 2.

In addition, the undoped endcaps 11 reduce the possibility of thermal fracturing of the rod and lensing due to bulging of the rod 2.

The undoped YAG endcaps 11 are preferably diffusion-bonded to the central section of the Tm:YAG rod 2. However, it will be appreciated that any suitable method of attachment may be used to fix the undoped endcaps 11 to the central section of the Tm:YAG rod 2.

The application of the present invention is not limited to lasers employing Tm:YAG, and the invention may also be used with any other quasi-three-level laser material. Examples of quasi-three-level laser materials include Yb:YAG (ytterbium-doped yttrium-aluminium-garnet), Tm:YLF (thulium-doped yttrium lithium fluoride) and Tm:YALO (thulium-doped yttrium aluminate).

It will be appreciated that the present invention provides a powerful and efficient laser, which alleviates many of the disadvantages of present lasers employing quasi-three-level laser materials. It will also be appreciated that the side-pumping of the laser rod allows a relatively large degree of freedom with regard to cavity design.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof. an electron in the ion to be promoted from the $^3H_6$ energy level to the $^3H_4$ energy level. The electron then falls to the $^3F_4$ energy level, before returning to the $^3H_6$ energy level, causing a photon of the desired laser wavelength, as described above.

The $^3H_6$ energy level is sufficiently close to the ground state of a $Tm^{3+}$ ion to be thermally populated at room temperature, and clearly the thermal population of this energy level can hinder the return of promoted electrons back to the energy level. Hence, the reduction in temperature of the rod 2 of Tm:YAG provided by the flow of cooling liquid through the flow tube 3 helps to increase the efficiency of the device 1.

The transitions involved in up conversion and cross relaxation processes, as discussed above, are also indicated on FIG. 3.

As will be understood by a person skilled in the art, Tm:YAG is an example of a quasi-three-level laser material, which materials are characterised by the lower lasing level being sufficiently close to the ground state of the material for this lower lasing level to be thermally populated. Quasi three-level lasers require more intense pumping in order to attain population inversion and overcome the lasing threshold than more conventional 4-level lasers.

Figure 4:
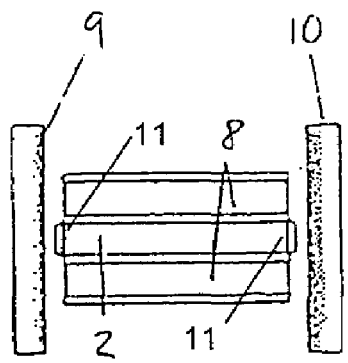
FIG. 4 is a schematic representation of part of the device of FIG. 1.

With reference to FIG. 4, a schematic representation of the rod 2 of Tm:YAG and the concentrator block 5 is shown. First and second mirrors 9, 10 are provided opposite respective ends of the rod 2. The first mirror 9 is highly reflective to radiation having a wavelength in the region of 2 μm (R>99.5% at 2.02 μm). The second mirror 10 is a laser output coupler, the reflectivity of which may vary. In a preferred embodiment of the present invention, the

The invention claimed is:

1. A device for producing laser radiation, the device comprising:
    an elongate sample of a quasi-three-level laser material having respective ends, and an endcap provided at each end of the sample, the endcaps comprising substantially undoped laser material;
    a source of pumping radiation; and
    a concentrator having a longitudinal axis and comprising an elongate passage that has a substantially uniform cross-section along the axis, the passage also having walls comprising a pair of substantially parabolic mirrors arranged between the source of pumping radiation and the sample and configured such that at least some of the pumping radiation emitted by the source of pumping radiation is concentrated by the concentrator and subsequently enters the sample through a side surface thereof;
    wherein the sample is a quasi-three-level laser material containing $Tm^{3+}$ ions doped to a concentration of around 3% and the ratio of the cross-sectional width of the sample and the cross-sectional width of the chamber is at least 3/5.

2. A device according to claim 1, wherein the sample is a sample of Tm:YAG, Tm:YLF or Tm:YALO.

3. A device according to claim 1, comprising a plurality of sources of pumping radiation, each of the sources of pumping radiation being associated with a respective concentrator.

4. A device according to claim 1, wherein the endcaps comprise substantially undoped YAG, YLF or YALO.

5. A device according to claim 1, wherein the sample has a central doped section with an atomic doping concentration of around 3%.

6. A device according to claim 1, including cooling means such that the sample is cooled by the flow of a liquid therepast.

7. A device according to claim 6, wherein the liquid is water or a mixture of water and glycerol.

8. A device according to claim 1, further comprising a pair of mirrors positioned opposite opposing ends of the sample.

9. A device according to claim 1, including a block member having a central chamber and wherein the sample is housed in the chamber, the ratio of the cross-sectional width of the sample and the cross-sectional width of the chamber being at least 3/5.

10. A method of producing laser radiation, the method comprising the steps of:
    providing an elongate sample of a quasi-three-level laser material having endcaps of substantially undoped laser material;
    housing the elongate sample in a pump chamber the ratio of the cross-sectional width of the sample and the cross-sectional width of the chamber being at least 3/5;
    providing a source of pumping radiation;
    providing a concentrator having a longitudinal axis and comprising an elongate passage having a substantially uniform cross-section along the axis, the passage also having walls comprising a pair of substantially parabolic mirrors;
    arranging the concentrator between the source of pumping radiation and the sample; and
    configuring the concentrator such that at least some of the pumping radiation emitted by the source of pumping radiation is concentrated by the concentrator and subsequently enters the sample through a side surface thereof;
    wherein the step of providing a sample comprises the step of providing a sample that is a quasi-three-level laser material containing $Tm^{3+}$ ions; and
    the step of providing a sample comprises the step of providing a sample having an atomic doping concentration of around 3%.

11. A method according to claim 10, wherein the step of providing a sample comprises the step of providing a sample of Tm:YAG, Tm:YLF or Tm:YALO.

12. A method according to claim 10, comprising the step of providing a plurality of sources of pumping radiation, each of the sources of pumping radiation being associated with a respective concentrator.

13. A method according to claim 10, wherein the endcaps comprise substantially undoped YAG, YLF or YALO.

14. A method according to claim 10, further comprising the step of cooling the sample by the flow of a liquid therepast.

15. A method according to claim 14, wherein the liquid is water or a mixture of water and glycerol.

16. A method according to claim 10, further comprising the step of providing a pair of mirrors positioned opposite opposing ends of the sample.

* * * * *